US011763550B2

United States Patent
Dupont De Dinechin et al.

(10) Patent No.: US 11,763,550 B2
(45) Date of Patent: Sep. 19, 2023

(54) FORMING A DATASET FOR FULLY-SUPERVISED LEARNING

(71) Applicant: DASSAULT SYSTEMES, Velizy Villacoublay (FR)

(72) Inventors: Louis Dupont De Dinechin, Velizy Villacoublay (FR); Asma Rejeb Sfar, Velizy Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 305 days.

(21) Appl. No.: 17/086,078

(22) Filed: Oct. 30, 2020

(65) Prior Publication Data

US 2021/0049420 A1 Feb. 18, 2021

Related U.S. Application Data

(63) Continuation of application No. 15/973,165, filed on May 7, 2018, now Pat. No. 10,929,721.

(30) Foreign Application Priority Data

May 5, 2017 (EP) .................................... 17305519

(51) Int. Cl.
  *G06V 10/774* (2022.01)
  *G06N 20/10* (2019.01)
  (Continued)

(52) U.S. Cl.
  CPC ...... *G06V 10/7753* (2022.01); *G06F 18/2155* (2023.01); *G06F 18/2185* (2023.01);
  (Continued)

(58) Field of Classification Search
  None
  See application file for complete search history.

(56) References Cited

U.S. PATENT DOCUMENTS 7,263,208 B1 * 8/2007 Crosby ............... G06V 10/255
                                                    382/103
2016/0335478 A1 * 11/2016 Bredno ................ G06T 7/0012
(Continued)

FOREIGN PATENT DOCUMENTS

WO   WO-2013135962 A1 *  9/2013 ............... G06T 7/20

OTHER PUBLICATIONS

Russakovsky, O., Deng, J., Su, H. et al. ImageNet Large Scale Visual Recognition Challenge. Int J Comput Vis 115, 211-252 (2015). https://doi.org/10.1007/s11263-015-0816-y (Year: 2015).*
(Continued)

*Primary Examiner* — Emily C Terrell
*Assistant Examiner* — Nathan J Bloom
(74) *Attorney, Agent, or Firm* — Oblon, McClelland, Maier & Neustadt, L.L.P.

(57) ABSTRACT

A computer-implemented method of signal processing comprises providing images. The method comprises for each respective one of at least a subset of the images: applying a weakly-supervised learnt function, the weakly-supervised learnt function outputting respective couples each including a respective localization and one or more respective confidence scores, each confidence score representing a probability of instantiation of a respective object category at the respective localization. The method further comprises determining, based on the output of the weakly-supervised learnt function, one or more respective annotations, each annotation including a respective localization and a respective label representing instantiation a respective object category at the respective localization. The method further comprises forming a dataset including pieces of data, each piece of data including a respective image of the subset and at least a part of the one or more annotations determined for the respective image. This improves the field of object detection.

19 Claims, 5 Drawing Sheets

(51) Int. Cl.
　　　*G06T 7/70*　　　(2017.01)
　　　*G06F 18/21*　　(2023.01)
　　　*G06F 18/23*　　(2023.01)
　　　*G06F 18/28*　　(2023.01)
　　　*G06F 18/214*　　(2023.01)
　　　*G06V 10/44*　　(2022.01)
　　　*G06V 10/24*　　(2022.01)
　　　*G06N 3/08*　　(2023.01)

(52) U.S. Cl.
　　　CPC .............. *G06F 18/23* (2023.01); *G06F 18/28* (2023.01); *G06N 3/08* (2013.01); *G06N 20/10* (2019.01); *G06T 7/70* (2017.01); *G06V 10/245* (2022.01); *G06V 10/454* (2022.01)

(56) References Cited

U.S. PATENT DOCUMENTS

| | | | |
|---|---|---|---|
| 2017/0316333 A1* | 11/2017 | Levinson | B60W 60/00274 |
| 2017/0345153 A1* | 11/2017 | Wang | G06T 7/246 |
| 2017/0372232 A1* | 12/2017 | Maughan | G06F 3/0482 |
| 2018/0018553 A1* | 1/2018 | Bach | G06N 3/02 |
| 2018/0129906 A1* | 5/2018 | Habi | G06V 10/764 |
| 2018/0144466 A1 | 5/2018 | Hsieh | |
| 2019/0318208 A1* | 10/2019 | Chai | G06K 9/6256 |
| 2020/0027237 A1* | 1/2020 | Baumgartner | G06V 10/82 |
| 2022/0263860 A1* | 8/2022 | Crabtree | G06F 11/3006 |

OTHER PUBLICATIONS

Zhou, Bolei, et al. "Learning deep features for discriminative localization." Proceedings of the IEEE conference on computer vision and pattern recognition. 2016. (Year: 2016).*
Backpropagation Applied to Handwritten Zip Code Recognition by Y. LeCun, pp. 541-551, Sep. 12, 1989.
ContextLocNet: Context-Aware Deep Network Models for Weakly Supervised Localization by Vadim Kantorov, pp. 1-16, Sep. 12, 2016.
Faster R-CNN: Towards Real-Time Object Detection with Region Proposal Networks by Shaoqing Ren, pp. 1-14, Jan. 6, 2016.
Fast R-CNN by Ross Girshick, pp. 1140-1148, Apr. 18, 2015.
ImageNet Large Scale Visual Recognition Challenge by Olga Russakovsky, pp. 1-43, Jan. 30, 2015.
Learning Internal Representations by Error Propagation by D. E. Rumelhart pp. 317-362.
Localizing Objects While Learning Their Appearance by Thomas Deselaers, pp. 1-14.
LSDA: Large Scale Detection through Adaptation by Judy Hoffman, pp. 1-9.
Multiple Instance Learning: Algorithms and Applications by Boris Babenko, pp. 1-17.
PAC Learning Axis-Aligned Rectangles With Respect To Product Distributions From Multi-instance Examples by Philip M. Long, pp. 1-5.
The Pascal Visual Object Classes (VOC) Challenge by Mark Everingham, pp. 1-34.
PVANET: Deep but Lightweight Neural Networks for Real-time Object Detection by Kye-Hyeon Kim, pp. 1-7.
R-FCN: Object Detection via Region-based Fully Convolutional Networks by Jifeng Dai, pp. 1-11, Jun. 21, 2016.
Rich feature hierarchies for accurate object detection and semantic segmentation by Ross Girshick, pp. 1-21, Oct. 22, 2014.
Segmentation as Selective Search for Object Recognition by Koen E. A. van de Sande, pp. 1-8.
Survey of Clustering Algorithms by Rui Xu, pp. 645-678, IEEE Transactions on Neural Networks, Vol. 16, No. 3, May 2005.
Weakly Supervised Deep Detection Networks by Hakan Bilen, pp. 1-9.
Weakly Supervised Object Detection with Convex Clustering by Hakan Bilen, pp. 1081-1089.
Weakly Supervised Object Localization with Multi-fold Multiple Instance Learning by Ramazan Gokberk Cinbis. pp. 1-15, Jan. 22, 2016.
Weakly Supervised Object Localization with Progressive Domain Adaptation by Dong Li, pp. 1-9.
We don't need no bounding-boxes: Training object class detectors using only human verification by Dim P. Papadopoulos, pp. 1-10.
European Search Report dated Nov. 10, 2017 issued in European Patent Application No. EP17305519.5.
Is object localization for free? Weakiy-supervised learning with convolutional neural networks by Maxime Oquab—XP32793478A, pp. 685-694.
Deep Multiple Instance Learning for Image Classification and Auto-Annotation by Jiajun Wu—XP32793796A, pp. 3460-3469.
Learning Deep Features for Discriminative Localization by Bolei Zhou—XP33021473A, pp. 2921-2929, Mar. 19, 2016.
Weakly supervised target detection in remote sensing images based on transferred deep features and negative bootstrapping by Peicheng Zhou—XP36031188A, pp. 925-944, Nov. 28, 2015.
Artificial Neural Networks: A Tutorial by AnilK. Jain—XP55421356A, pp. 31-44, Mar. 1996.

* cited by examiner

FORMING A DATASET FOR FULLY-SUPERVISED LEARNING

CROSS-REFERENCE TO RELATED APPLICATIONS

This application is a continuation application of, and claims the benefit of priority under 35 U.S.C. § 120 from, U.S. application Ser. No. 15/973,165, filed May 7, 2018, which claims the benefit of priority under 35 U.S.C. § 119 or 365 to European Application No. EP 17305519.5, filed May 5, 2017. The entire contents of the above application(s) are incorporated herein by reference.

FIELD OF THE INVENTION

The invention relates to the field of computer programs and systems, and more specifically to methods, devices, data structures and programs related to signal processing.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context and other contexts, scene understanding is gaining wide importance. Scene understanding notably relates to object detection solutions such as Multiple Object Detection algorithms. For example, given an image, a Multiple Object Detection algorithm may include simultaneously locating and recognizing all instances of multiple objects. Object detection may be useful in many applications, such as self-driven cars or body-worn cameras for blind or partially sighted people.

The following papers relate to this field and are referred to hereunder:
- [1] Y. Lecun et al. "Backpropagation applied to handwritten zip code recognition", Neural Comput, 1989
- [2] S. Ren, et al., "Faster R-CNN: Towards Real-Time Object Detection with Region Proposal Networks", NIPS 2015
- [3] J. Dai et al., "R-FCN: Object Detection via Region-based Fully Convolutional Networks", NIPS 2016
- [4] K. Kim et al., "PVANET: Deep but Lightweight Neural Networks for Real-time Object Detection", NIPS 2016
- [5] O. Russakovy et al., "ImageNet Large Scale Visual Recognition Challenge", IJCV 2015
- [6] The paper published at the following URL at the priority date of the present application: http://host.robots.ox.ac.uk/pascal/VOC/voc2012/[7]
- [7] V. Kantorov et al. "ContextLocNet: Context-Aware Deep Network Models for Weakly Supervised Localization", ECCV 2016
- [8] H. Bilen and A. Vedaldi "Weakly Supervised Deep Detection Networks", CVPR 2016
- [9] D. Li et al, "Weakly Supervised Object Localization with Progressive Domain Adaptation", CVPR 2016
- [10] Dim P. Papadopoulos et al, "We don't need no bounding-boxes: Training object class detectors using only human verification", CVPR 2016
- [11] J. Hoffman et al. "LSDA: Large Scale Detection trough Adaptation", NIPS 2014
- [12] H. Bilen et al. "Weakly supervised object detection with convex clustering", CVPR 2015
- [13] P. M; Long et al. "Pac learning axis-aligned rectangles with respect to product distributions from multiple-instance examples", Machine Learning 30(1) 1998
- [14] B. Babenko "Multiple Instance Learning: Algorithms and Applications" Technical Report, University of California, San Diego 2004
- [15] R. G. Cinbis, et al. "Weakly supervised object localization with multi-fold multiple instance learning", arXiv 2015
- [16] T. Deselaers et al. "Localizing objects while learning their appearance" ECCV 2010
- [17] R. Girshick, "Fast R-CNN", ICCV 2015
- [18] R. Girshick et al. "Rich feature hierarchies for accurate object detection and semantic segmentation" CVPR 2014
- [19] Koen E. A. van de Sande et al. "Segmentation as Selective Search for Object Recognition", ICCV 2011
- [20] Rumelhart et al. "Learning internal representations by error backpropagation", 1986
- [21] Everingham et al. "The PASCAL Visual Object Classes (VOC) Challenge"

There has been a large body of recent research on Multiple Object Detection for scene understanding. Such methods typically attempt to recognize objects and localize all instances in the form of bounding boxes in images, where multiple objects in different viewpoints and configurations appear in cluttered backgrounds. Current state-of-the-art methods employ Deep Learning, based on Convolutional Neural Networks (CNN) [1]. Different levels of supervision can be considered to train such models. For the task of multiple object detection, the most common ones are full supervision and image-level supervision, also called weak supervision.

Fully-supervised learning methods [2, 3, 4] achieve the best accuracy on standard benchmarks [5, 6], but they require very costly training datasets. Indeed, in this case, each training image is labeled with the different object locations (e.g. bounding boxes) and categories (e.g. "person", "car", "building", etc).

To reduce the up-front annotation time/cost to learn object detectors, recent works have focused on training models in a weakly-supervised setting using image-level labels [7, 8, 9, 10, 11]. In this case, the only information available during the training is the set of object categories present in the image, without any information of localization or number of occurrences.

Despite the progress thanks to the deep learning paradigm, image-level supervision for object detection remains a very challenging problem. The state-of-the-art performance of the weakly-supervised setting is still considerably lower (half lower) compared to the fully-supervised counterparts.

Several existing weakly-supervised learning methods [10, 11, 12] are formulated as or are closely related to Multiple Instance Learning (MIL) [13, 14]. In this formulation, an image is interpreted as a bag of regions. If the image is labeled as positive, then one of the regions is assumed to tightly contain the object of interest. If the image is labeled as negative, then no region contains the object. Learning alternates between estimating a model of the object appearance and selecting which regions in the positive bags correspond to the object using the appearance model. The MIL strategy results in a non-convex optimization problem. In practice, solvers tend to get stuck in local optima such that the quality of the solution strongly depends on the initialization [15,16].

Also, as CNNs have turned out to be surprisingly effective in many vision tasks including classification and detection, recent state-of-the-art weakly-supervised approaches also build on CNN architectures or CNN features. For instance, in [8] the authors modify a region-based CNN architecture [17] and propose a CNN with two streams, one focusing on recognition and the other one on localization that performs simultaneously region selection and classification by end-to-end training from image-level labels. While these approaches have shown promising results, they suffer some drawbacks. Typically, they depend on the quality of region candidates which are extracted from external algorithm [19]. Such candidates usually contain too much noise which makes it hard to select correct object proposals. Generally, only a few out of several thousands of proposals are actual object instances.

In this context, there still exists a need of an improved solution in the field of object detection.

SUMMARY OF THE INVENTION

It is therefore provided a computer-implemented method of signal processing. The method comprises providing images. The method also comprises, for each respective one of at least a subset of the images, applying a weakly-supervised learnt function, and determining, based on the output of the weakly-supervised learnt function, one or more respective annotations. The weakly-supervised learnt function outputs respective couples. Each couple includes a respective localization and one or more respective confidence scores. Each confidence score represents a probability of instantiation of a respective object category at the respective localization. Each annotation includes a respective localization and a respective label. The label represents instantiation of a respected object category at the respective localization. The method also comprises forming a dataset. The dataset includes pieces of data. Each piece of data includes a respective image of the subset and at least a part of the one or more annotations determined for the respective image.

The method allows forming a dataset configured for the fully-supervised learning of a function. The fully-supervised learning is achievable thanks to the dataset comprising not only information on object categories instantiated in images, but also information on the localization of the instantiations. The annotations determined by the method are referred to as "pseudo strong annotation", in the sense that these annotations provide as much information as prior art strong annotations, that is, annotations stemming from users manually localizing objects in images. The method may thus further comprise such a fully-supervised learning.

As for the weakly-supervised learnt function, the fully-supervised learnt function applies to images and outputs respective couples. Each outputted couple includes a respective localization and one or more respective confidence scores. Each confidence score represents a probability of instantiation of a respective object category at the respective localization. As for the weakly-supervised learnt function, the fully-supervised learnt function is thereby configured to detect instances of object categories in images, and thus allows scene understanding. The method may thus feed a detection process, which may comprise providing the fully-supervised learnt function and applying the fully-supervised learnt function to one or more images, for example at least a part of which not being included in the images initially provided.

Now, the method forms the dataset in an easier way than the prior art where it is required that users identify information on localization of objects manually. Indeed, the method includes applying a weakly-supervised learnt function, which means that, at a prior stage, an initial dataset is available including initial pieces of data. Each initial piece of data includes a respective image and a respective annotation. In this case, the annotation consists of a respective set of labels, and each label represents instantiation of a respective object category in the respective image. Such information provided with each image of the initial dataset and necessary for performing a weakly-supervised learning is called "weak annotation" in the prior art. The weak annotations of the initial dataset may exclude any localization information, and are thus lighter and accordingly easier to manually produce than information necessary for a fully-supervised learning, that is strong annotations.

In examples, the method may be included in a process that comprises providing such an initial dataset, such providing being relatively easy, even if performed manually, compared to manually providing a dataset configured for a fully-supervised learning. The process may also comprise learning the weakly-supervised learnt function based on the initial dataset. The process may then comprise forming the dataset configured for the fully-supervised learning, based on provided images which may consist of or include a subpart or the whole of the images of the initial dataset, and/or consist of or include images not included in the initial dataset.

Such a framework may exclude any user manually indicating localization of object instances in images, at least from scratch. Indeed, the method comprises simply applying the weakly-supervised learnt function, and then determining annotations based on the output of the weakly-supervised learnt function, where localization information is already available and can be based upon. The localization information thus does not need to be indicated manually from scratch. In examples, the applying of the weakly-supervised learnt function, the determining of the annotations and the forming of the dataset may be performed fully-automatically, possibly after a user launching the method.

In examples, the method may comprise one or more of the following:

the localization of each respective annotation corresponds to one or more localizations outputted by the weakly-supervised learnt function;

the object category respective to each respective annotation is an object category having a probability of instantiation, at the one or more localizations outputted by the weakly-supervised learnt function that correspond to the localization of the respective annotation, which is represented by a respective confidence score which is strictly superior to zero;

the object category respective to each respective annotation is the object category having a probability of instantiation, at the one or more localizations outputted by the weakly-supervised learnt function that correspond to the localization of the respective annotation, which is represented by the highest confidence score;

the object category respective to each respective annotation is an object category having a probability of instantiation, at the one or more localizations outputted by the weakly-supervised learnt function that correspond to the localization of the respective annotation, which is represented by a respective confidence score which is superior to a strictly positive threshold;

the threshold has a value which depends on a mean number of objects in the images;

for each respective image of at least a part of the subset, the respective image is provided with respective initial labels, each initial label representing instantiation of a respective object category in the respective image, and the label of each respective annotation of the respective image representing instantiation of a respective object category corresponding to an initial label of the respective image; and/or the one or more localizations outputted by the weakly-supervised learnt function that correspond to the localization of a respective annotation are identified via a clustering algorithm.

It is further provided a dataset formable by the method. In other words, the dataset includes pieces of data, each piece of data including a respective image and, for at least a part of the images, one or more respective annotations each including a respective localization and a respective label representing instantiation a respective object category at the respective localization.

It is further provided a function learnable by the method of the above-mentioned example where it comprises a fully-supervised learning based on the formed dataset. In other words, the function constitutes a scheme that transforms inputs into an output, the scheme being obtainable by the method. The function may be used in a computer-implemented process for detecting objects in images.

It is further provided a computer program comprising instructions for performing the method and/or the process.

It is further provided a data structure comprising the dataset, the function and/or the program.

It is further provided a computer readable storage medium having recorded thereon the data structure.

It is further provided a device comprising a data storage medium having recorded thereon the data structure. The device may form a non-transitory computer-readable medium. The device may alternatively comprise a processor coupled to the data storage medium. The device may thus form a system. The system may further comprise a graphical user interface coupled to the processor.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

By "computer-implemented", it is meant that steps (or substantially all the steps) are executed by at least one computer, or any system alike. Thus, steps are performed by the computer, possibly fully automatically, or, semi-automatically. In examples, the triggering of at least some of the steps may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Figure 1:
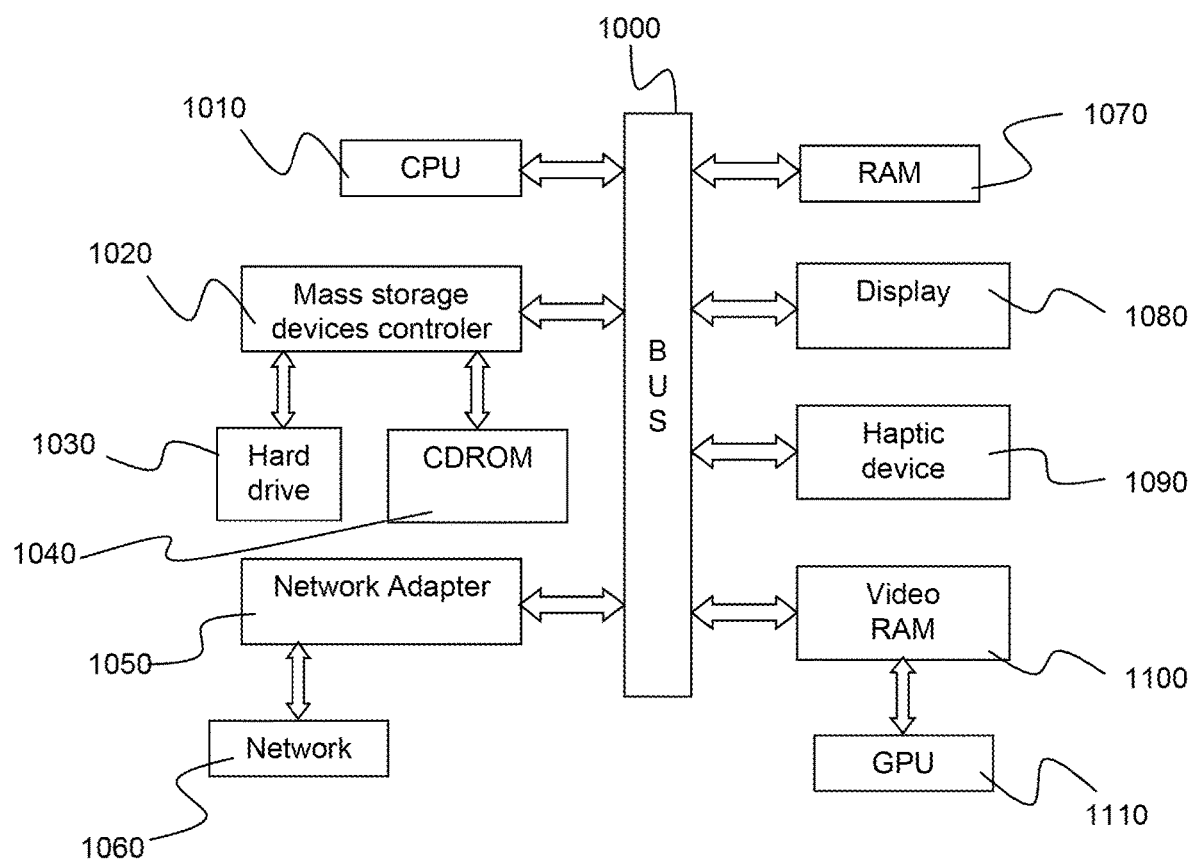
FIG. 1 shows an example of the system.

FIG. 1 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Different concepts known per se from the field of object detection in images are now discussed.

An image is a data structure that represents a spatial distribution of a physical signal, for example on a scene. The spatial distribution may be of any dimension, for example 2D or 3D. The spatial distribution may be of any shape, for example forming a grid and thereby defining pixels, the grid being possibly irregular or regular. The physical signal may be any signal, for example color or level of gray or depth, such that the image may be an RGB image or a grayscale image or a depth image. The image may be a synthetic image or alternatively a natural image, such as a photo. The images provided and/or to which the fully-supervised learnt function is to apply may all be a of a same type, for example all rectangular 2D RGB or grayscale or depth images. Alternatively, a set of different image types may be contemplated.

The expression "object category" designates any class of entities (i.e. objects) which can be instantiated and localized in an image, the entities being to at least some extent recognizable as belonging to the same class by object detectors such as the weakly-supervised learnt function(s). An object category is said to be instantiated at a respective localization of an image if a version of the object category, in other words an object of the category, is represented at the respective localization.

Different instances of a same object category, in other words different objects of a same category, may present different characteristics. For example, different models of cars represented in a same image may all be considered as instances of the same object category, e.g. the "car" category.

The weakly-supervised learnt function(s) being configured to detect instances of object categories in images, the object categories contemplated by the method may form a predetermined set of object categories, e.g. corresponding to all categories detectable by the weakly-supervised learnt function(s). The predetermined set of objects may thus be defined by the configuration or capabilities of the weakly-supervised learnt function(s).

The level of differentiation between categories may depend on the level of details conveyed by the predetermined set. In other words, depending on the capacities of differentiation of the weakly-supervised learnt function(s), a car and a truck may be considered as belonging to the same object category (e.g. "vehicle") or to different categories ("car" and "truck").

The term "localization" designates any positioning information with respect to an image. A localization may for example define a subpart of an image. The subpart may be convex and/or convex. Localizations contemplated by the method may for example be limited to bounding boxes, that is, rectangles defining subparts of the image therein. In another example, the weakly-supervised learnt function(s) and/or fully-supervised learnt function may output localizations defined by a segmentation of input images, in other words a format where each pixel is associated to a segment, each segment being thereby localized.

Images, or respectively localizations in images may be provided with labels. Each label represents instantiation of a respective object category. In other words, each label is a piece of data representing the fact that there is at least one instance of a respective object category (i.e. an object of the respective category) in the image, or respectively exactly one instance of a respective object category at the localization. Labels may thereby be present at the image level, in which case the labels form weak annotations of the image, that is, labels allowing merely a weakly-supervised learning, or at the localization level, in which case the labels further allow a fully-supervised learning.

The expression "detection of an object in an image" designates any process which relates to the automatic recognition of instantiation of an object category in the image. The weakly-supervised learnt function(s) and the fully-supervised learnt function are configured to perform such detection. In particular, the "weakly-supervised learnt function" and the "fully-supervised learnt function" are each configured to take an image as input and to output, for an input image, respective couples. Each outputted couple forms a piece of data including a respective localization and one or more respective confidence scores. Each confidence score represents a probability of instantiation of a respective object category at the respective localization. Such outputted information may be post-processed in any way for any specific scene understanding application.

The weakly-supervised learnt function(s) and the fully-supervised learnt function differ one with the other in the way they are learnt. However, for a same dataset configured for fully-supervised learning (and thus a fortiori for weakly-supervised learning), a fully-supervised learnt function generally performs better than a weakly-supervised learnt function in the sense that it performs object detection with more accuracy. Indeed, the weakly-supervised learning has to include the learning of how to locate objects corresponding to labels of the dataset, since such information is not provided in the annotations. On the contrary the fully-supervised learning can focus on recognizing the object categories per se, since the localization information is already provided and set by the annotations. The weakly-supervised learnt function(s) and the fully-supervised learnt function contemplated by the method may be any function of those formats, examples being provided later.

The framework of the method may be based, as for prior art object detectors such as [18], on deep learning models. Different concepts known from the field of deep learning applied to object detection and implementable by the method are now discussed.

Deep learning models are characterized by millions of parameters which values cannot be set by hand. Hence, these parameters must be set thanks to a learning algorithm. When the learning algorithm is updating the model parameters, the model is said to be in "training mode". It consists in successively "correcting" the model according to its output for each input thanks to the annotations associated with each input. An annotation is a set of data associated with a specific input which allows evaluation if the output of the model is true or false. For instance, an object classifier which is trained to distinguish images of cats and dogs may perform based on a dataset of annotated images of cats and dogs, each annotation being "cat" or "dog". Thus, if in its training mode the object classifier outputs "dog" for a cat image in input, the learning algorithm will correct the model by updating its parameters. This way of supervising the training of a model thanks to an annotated dataset is called "supervised learning".

Once the model is trained, one stops updating its parameters. Then, the model is only used to process a new input (i.e. an unseen input during the training mode) and return detection results, it is said to be in "test mode".

An object detector may return two different outputs as the task of "detection" may mean performing jointly a task of recognition (or classification) and a task of localization.
1. Localization output: object localization may be made thanks to bounding boxes. A bounding box is a rectangular box which axes are parallel to the image sides. It is characterized by four coordinates. Ideally, an object detector may return for each object a bounding box centered on the object with appropriate ratio and scale.
2. Classification output: object classification may be made thanks to a category label associated with a confidence score for each bounding box. A confidence score may be a real between 0 and 1. The closer it is to 1, the more confident the object detector is for the category label associated with the corresponding bounding box.

For such models, two paradigms can be distinguished:
Fully-supervised object detection: In this paradigm, annotations may be labeled bounding boxes. They are denoted as "strong annotations". In this paradigm, annotations allow to separately correct the two different outputs.
Weakly-supervised object detection: In this paradigm, annotations may be only image-level labels, i.e. each image is annotated by a list of object categories which appeared into the image. They are denoted as "weak annotations". No information concerning object localization is provided, and also possibly nor on the number of occurrences per object category. Thus, the localization output cannot be directly corrected thanks to image-level labels. However, weakly-supervised object detectors are designed to be trained with this kind of supervision and return the same kind of output as fully-supervised object detectors.

The method implements the paradigm of weakly-supervised object detection. Within this paradigm, models are trained with a dataset of weakly-annotated images.

In the prior art, weakly-supervised object detectors are directly trained with weak annotations (i.e. only image-level labels) and return detection results in the form of bounding boxes associated with a confidence score for each object categories.

A possibility offered by the method is the one of training an object detector with only image-level category labels without any localization information. The method may thus consist in a novel weakly-supervised object detection framework in which one may leverage the high performance of fully-supervised object detectors and the low annotation cost of weakly-supervised object detectors.

Figure 2:
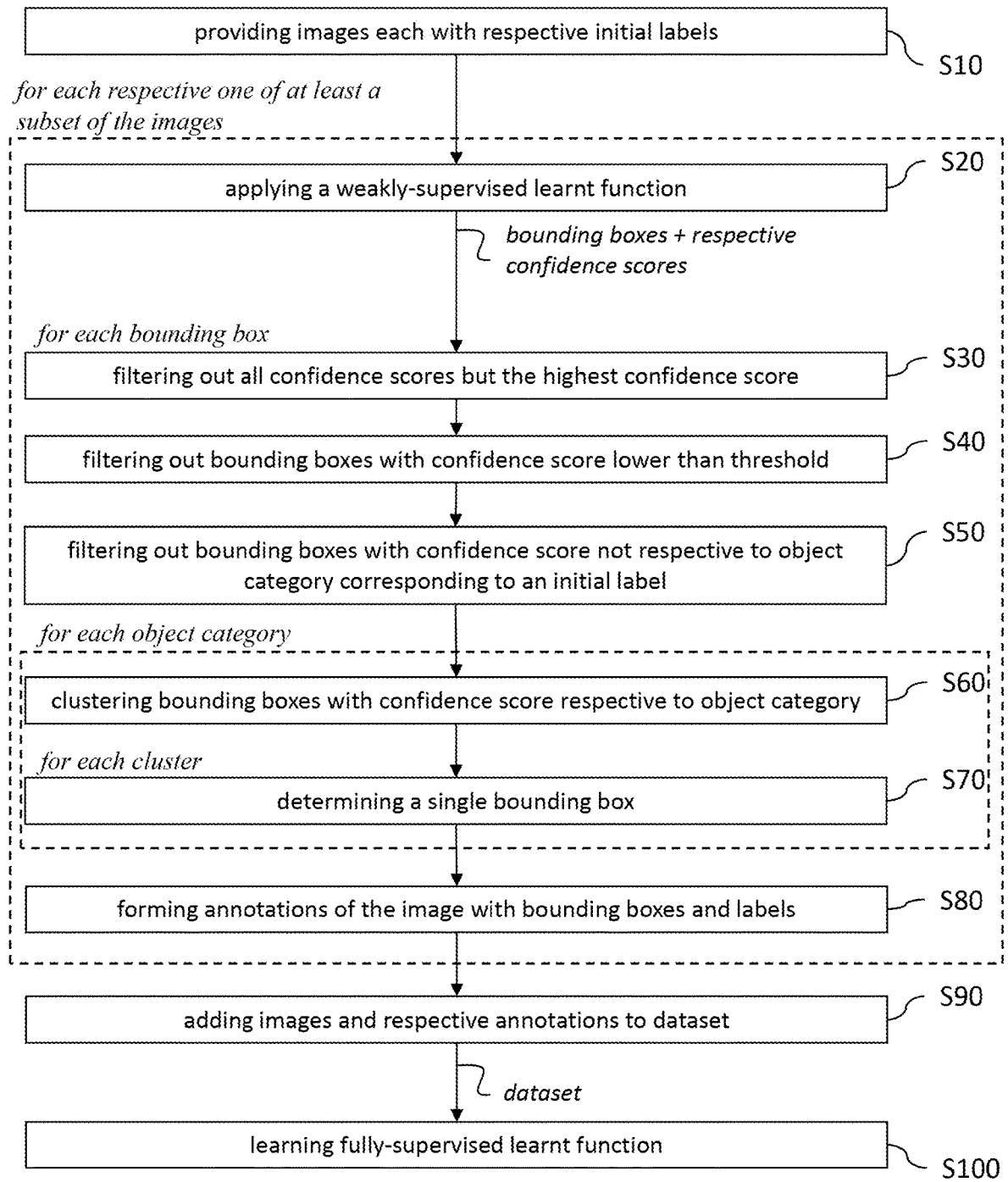
FIGS. 2, 3, 4, 5, 6, 7, 8, 9 and 10 illustrate examples of the method.

FIG. 2 shows a flowchart of an example of the method.

The method of FIG. 2 comprises providing S10 images. Each image provided at S10 is provided with respective initial labels. The data provided at S10 thus forms a dataset configured for the learning of any weakly-supervised learnt function, for example the one(s) involved at S20. The method of FIG. 2 may thus comprise such weakly-supervised learning after S10 and before S20.

The initial labels also allow performing a specific filtering out at S50 which improves the formed dataset. This is also true in case only the images of the subset are provided with respective initial labels. Now, the following discussion also applies in case no initial labels are provided at all at S10, considering that S50 is discarded (in other words, that the output of S40 is inputted directly to S60) in which case the discussions related to S50 are to be discarded.

The method of the example comprises performing a specific scheme S20-S80 for each image of at least a subset of the images provided at S10. At any time of the whole processing, images provided at S10 may be discarded, for any reason (for example if an image proves useless, e.g. because it is corrupted or redundant with another image). Also, for a given image the output of any of S20-S80 may be void. In such a case, the scheme may be ended for the given image. The given image may then be discarded or yet provided as such to S90 as the void result can constitute useful information for the later learning S100. Such situations are not represented on the figure for the sake of clarity. The mentioned "subset" is in any case a part of the set of images provided at S10 for which S20-S80 is normally performed.

The scheme comprises applying S20 a weakly-supervised learnt function. The weakly-supervised function may be the same predetermined one for each image inputted to S20. In other examples, different weakly-supervised learnt functions may be applied at S20 depending on the inputted image.

The weakly-supervised learnt function outputs for each image bounding boxes and, for each outputted bounding box, a set of confidence scores. Each confidence score is associated to a respective object category detectable by the weakly-supervised learnt function and represents a probability of instantiation of the object category in the bounding box (according to the weakly-supervised learnt function). Put in other words, the weakly-supervised function knows a predetermined set of object categories (e.g. from the previous weakly-supervised learning), and for each image inputted at S20 the weakly-supervised function outputs bounding boxes supposed to contain an object and probabilities that the object belongs to each of the predetermined categories. The following discussions but S60-S70 however also apply to other type of localizations than bounding boxes.

At this point, the method of FIG. 2 implements options to process the output of S20 with respect to the dataset to be eventually formed. The options participate to form at S80 relevant annotations for the image inputted to S20 for the later fully-supervised learning S100. The annotations formed at S80 include bounding boxes each associated to a respective label indicative of an object category of which an instance (i.e. an object of the category) is supposed to be represented by the image in the bounding box. Now, the options aim at determining a correspondence between each bounding box to be included to the annotations at S80 and one or more bounding boxes outputted at S20. This is now explained.

The method first comprises looping on all the bounding boxes outputted by S20 and filtering out S30 all confidence scores not being the highest confidence score. In other words, the method selects for each bounding box the highest confidence score and discards information related to all other confidence scores (including associated object categories). At this point, the remaining information consists of pieces of data each including a respective bounding box among those outputted by S20, a single respective object category per bounding box, and a respective confidence score of instantiation of the respective object category at the respective bounding box.

The remainder of the method is to determine a correspondence between a bounding box to be included in the annotations at S80 and one or more bounding boxes in the remaining information associated to a same object category. Said same object category is thus one having a probability of instantiation represented by a respective confidence score which is not only strictly superior to zero but also the highest confidence score (of each of the corresponding bounding boxes). This allows a filtering ensuring a relevant dataset to be eventually formed at S90.

Now, the method of FIG. 2 implements other options in order to improve the filtering.

The method of the example notably comprises filtering out S40 all bounding boxes outputted by S30 associated to a confidence score lower (e.g. strictly or not) than a strictly positive predetermined threshold. This allows reducing the quantity of non-relevant information (because of a too low probability).

In examples, the threshold may have a value that depends on the mean number of objects in the images on which S20 is executed (i.e. average of instances of any object category per image, two instances of the same category being counted twice in such a case). Such a mean number may be pre-provided or computed or approximated (e.g. based on the output of S20 or S30) in any way and/or at any time beforehand.

The value of the threshold may be such that, the mean number of bounding boxes per image inputted to S60 is higher, for example strictly, than said mean number of objects per image inputted to S20. The method may for example contemplate a minimal average number of bounding boxes per image inputted to S60 in consideration of any later filtering (such as S50 in the example), said minimal average number being higher (e.g. strictly) than the mean number of objects per image inputted to S20, the threshold being any value ensuring this minimal average number to be reached. The method may explicitly determine such a threshold in any way, or alternatively iteratively filter in bounding boxes starting from the higher values of confidence score until the lower values, until the minimal average number of bounding boxes inputted to S60 is reached.

The method of the example further comprises for a given image filtering out S50 all bounding boxes outputted by S40 (i.e. all bounding boxes remaining after the two previous filters S30 and S40) which are associated to a confidence score corresponding to an object category not among the initial labels provided at S10 for the given image. Such a filtering out S50 considers that the initial labels substantially exhaustively indicate which object categories are instantiated in the images provided at S10, such that results inconsistent with this consideration are filtered out at S50. This proves particularly true when the initial labels stem from users adding weak annotations to images in order to create the initial dataset.

The method of the example then executes a clustering algorithm on each input image that is executed category-by-category. For each object category, the clustering algorithm finds groups (or clusters) of bounding boxes which are localized proximate one to another and can be supposed to represent a same object. The application S20 of the weakly-supervised learnt function indeed includes a level of uncertainty not only on the object category, which is represented by confidence score values different from 1, but also on the exact localization itself, which is represented by this plurality of bounding boxes corresponding to a single object instance.

Any clustering algorithm based on any localization distance may be implemented. In examples, the method implements a hierarchical clustering, that is, a clustering that outputs a dendrogram which can be cut at any given depth in order to produce a corresponding number of clusters. The given depth may be selected to correspond to a number of clusters equal to the mean number of objects in the images on which S20 is executed.

The method of the example then comprises, for each cluster, determining S70 a single corresponding bounding box, representing the cluster. This can be performed in any way, for example by averaging all the bounding box coordinates of the cluster. Alternatively, the clustering S60 may itself output the coordinates of the centroids of each cluster, such centroid corresponding in the present case to a bounding box which may be the one determined at S70. This bounding box determined at S70 is associated to the object category corresponding to the cluster and such information becomes at S80 an annotation of the current input image.

Eventually, the method forms at S90 the dataset with the images of the subset and said annotations, and the method of the example also comprises learning S100 (or training) an object detection function based on the dataset. Alternatively, the dataset could be sent to a third party for the learning.

In examples, the method may thereby offer a weakly-supervised object detection framework with advantages including:
  Higher accuracy than the current state-of-the-art weakly-supervised object detectors. The accuracy has been evaluated on tests thanks to a metric called the "mAP" (described in [21]). The higher the metric is, the more accurate the model is. The accuracy is expressed in percentage. Tests of the method have shown an improvement of the mAP from about 35% to about 40%.
  The object detector proposed by the method forms a unified model which does not depend on an external region proposal algorithm, which is time consuming and not accurate.
  Also, the approach of the method may be faster than state-of-the-art weakly-supervised approaches.

Examples of implementations of the method are now discussed. In these implementations, the method performs based on the following components in input:
  Model 1: an untrained weakly-supervised object detector. Such a detector is trained with only image-level labels, takes in input an image/scene and returns the same output as a fully-supervised object detector, i.e. a set of bounding boxes, each one associated with a label and a confidence score.
  Model 2: an untrained fully-supervised object detector. These types of object detectors need strong annotations and are far more effective than weakly-supervised object detectors.
  A dataset of images with weak annotations. Thus, each image of the dataset is associated with a list of object categories appearing in the image.

In these implementations, the method offers a framework composed of two successive stages:
  1. Offline stage: this stage aims at training Model 2 through four steps. This stage is transparent to the user.

Figure 3:
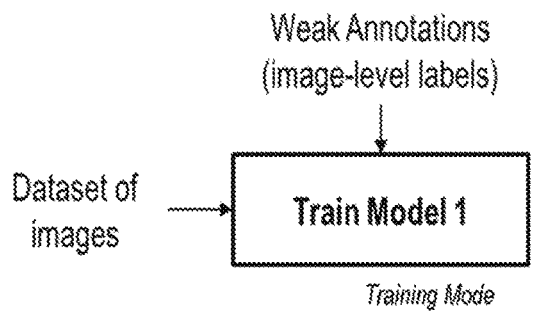
Figure 5:
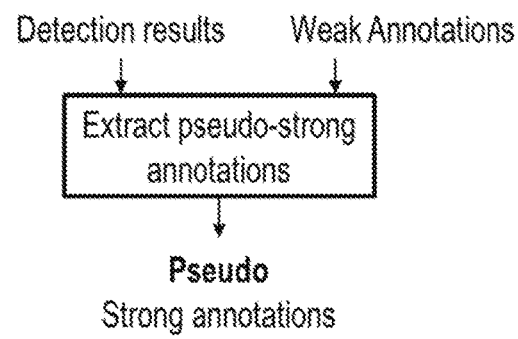
Figure 4:
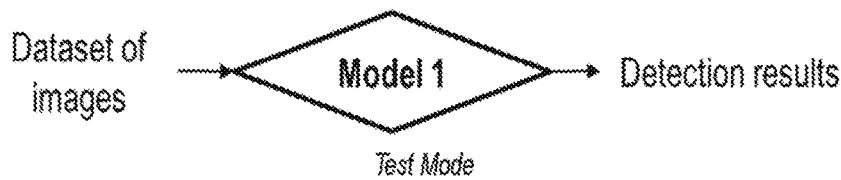

1) First, the method may comprise training Model 1 on the dataset of images with weak annotations, as shown on FIG. 3. Once trained, the method may pass this model in test mode.
2) Then, the method may comprise using Model 1 to process every image of the dataset, as shown on FIG. 4. Each image is now associated with weak annotations and the detection results provided by Model 1. The detection results provided by Model 1 are composed of a list of bounding boxes with a category label and a confidence score.
3) The method may comprise filtering these results to form "pseudo strong annotations", as shown on FIG. 5. This filtering may consist in two steps:
   i. First, the method may fix a confidence score threshold to keep the bounding boxes with a confidence score over this threshold.
   ii. Secondly, for each image, the method may keep only the bounding boxes which labels appeared in the initial weak annotations.

The images of the dataset are now associated with pseudo strong annotations.

Figure 6:
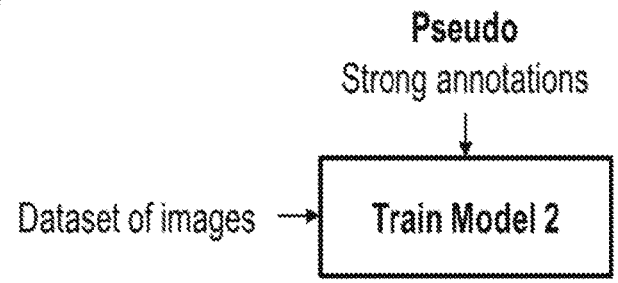

4) The method may comprise training Model 2 on the dataset with the annotations provided by step 3, i.e. the pseudo strong annotations, as shown on FIG. 6.

Figure 7:
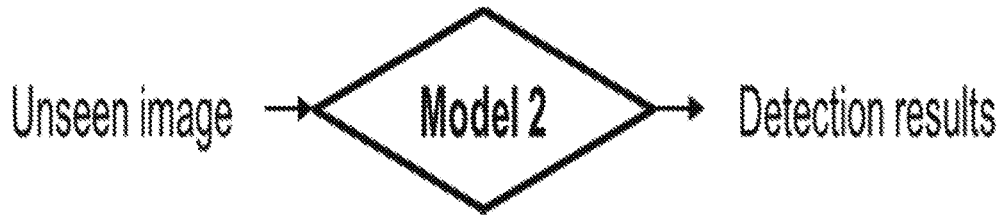

2. Online stage: Model 2 may be passed in test mode to perform object detection on any unseen input image, as shown on FIG. 7.

This weakly-supervised framework allows for performance gains between Model 1 and Model 2.

Figure 8:
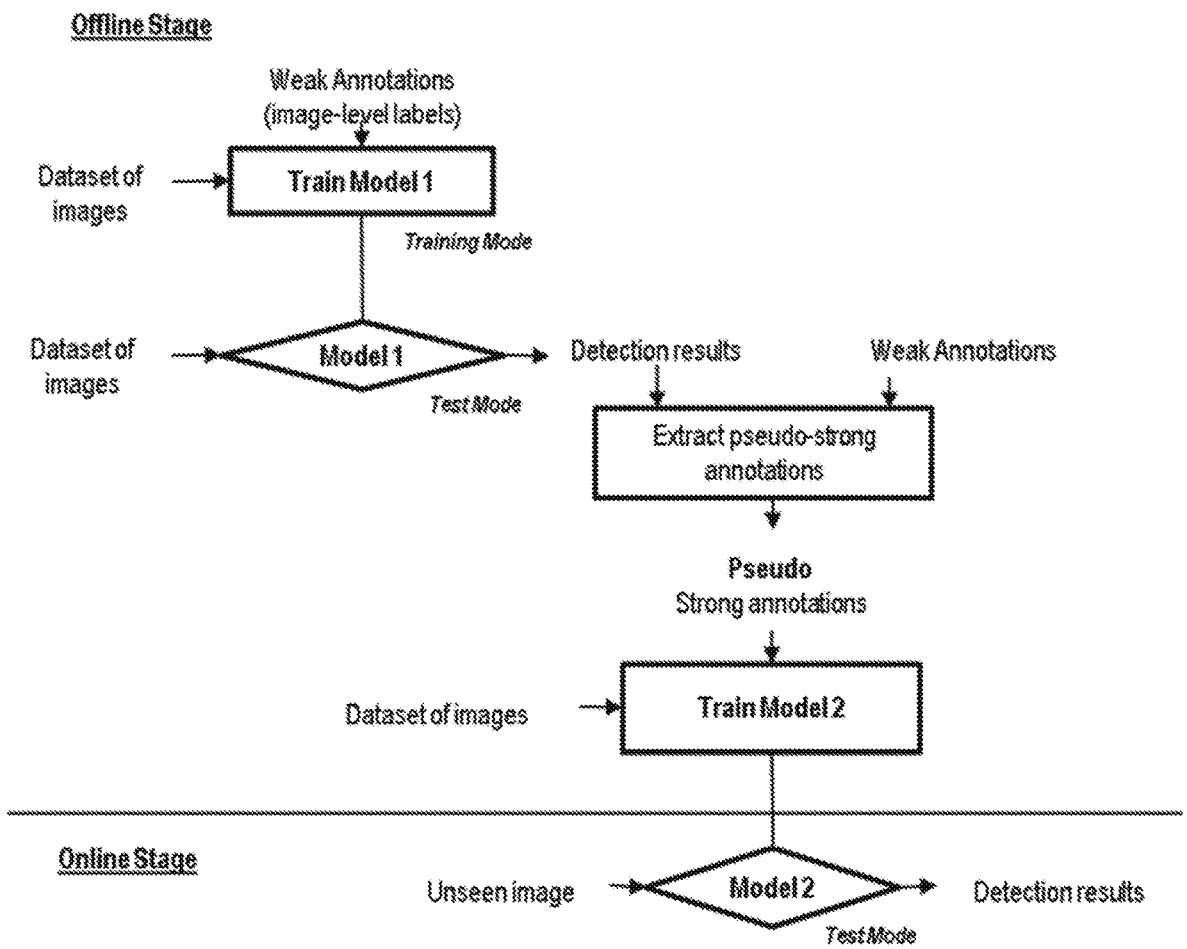

FIG. 8 illustrates such a technological workflow of the offline and the online stage:

Examples of implementation details of the filtering applied to model 1 detection results are now discussed.

Once the model 1 is trained, the method gets the detection results provided by model 1 in test mode for each image of Dataset 2. Thus, for each image the method gets a list of bounding boxes, each one associated with a probability vector which indicates for each category the probability that the image within the bounding box belongs to this category.

Figure 9:
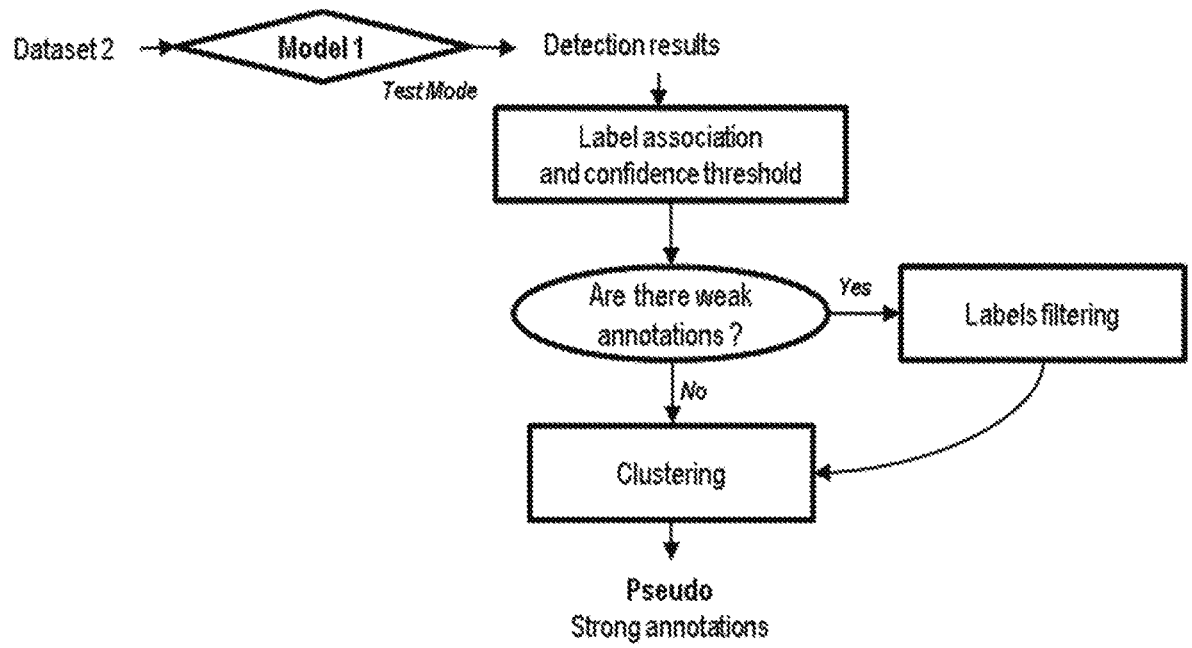

The process of bounding boxes filtering may be decomposed in three successive steps, as illustrated by FIG. 9, corresponding to examples respectively of S30-S40, S50 and S60-S70.

The first step includes a label association and a confidence threshold based filtering. An example is now discussed.

The method may first associate each bounding box to a single label and the corresponding value in the probability vector. The selected label may correspond to the one with the highest value in the probability vector. This value is called the confidence score of the bounding box. Then, a first filtering may be performed thanks to a confidence threshold: every bounding box with a confidence score lower than the confidence threshold is removed. The value of this confidence threshold, which is a number between 0 and 1, may depend on the characteristics of Dataset 2. For example, the method may be based on the mean number of objects per image of Dataset 2. If this mean number is not known a priori, an approximation of the mean may be determined. Given this information, the value of the confidence threshold may be set so that the mean number per image of bounding boxes in input of the clustering step is higher than the mean number of objects per image. Hence, the confidence threshold belongs to the interval [0, b] where b is the limit value so that the two means are equal.

The second step includes a Labels filtering. An example is now discussed.

After the first step, a second filtering may be performed if Dataset 2 is weakly annotated, i.e. if each image is associated with annotations indicating the list of object categories appearing within the image (and not appearing). This filtering may simply consist in only keeping the bounding box which label appears into the annotations.

The third step includes a clustering. An example is now discussed.

The bounding boxes returned by the previous filtering step may be filtered thanks to a clustering algorithm. The aim of this algorithm may be to reduce the localization noise of the bounding boxes. For each image, this algorithm is applied on the set of bounding boxes for each detected category independently. Given an image and a category with at least one detected bounding box, the method may apply the clustering algorithm on the set of bounding box coordinates which are 4D vectors. The number of clusters may be unknown. Any algorithm which solves the clustering problem for an unknown number of clusters may be implemented, such as Xmeans or hierarchical clustering (as described in paper "Survey of Clustering Algorithms" by Xu R, Wunsch D, in particular on pages 650-651). In an implementation which was tested with success and improvement of detection accuracy, the method may implement the hierarchical clustering algorithm. This method may consist in building a hierarchy of clusters based on an appropriate metric and a linkage criterion. One may test this algorithm using the Euclidean distance and the "single-linkage clustering". Other metrics and linkage criterion may be used. The algorithm builds a dendrogram. Given a certain height, the method can cut the dendrogram and get the clusters defined at this height. This height may be carefully chosen. In an example of the filtering, this height may be set so that the mean number of filtered bounding boxes in output of the clustering equals the mean number of objects per image within Dataset 2.

Examples of implementation details of the two models are now discussed.

A main goal of the method may be to train an object detector with only image-level category labels without any localization information. The method may consist in a novel weakly-supervised object detection framework which may leverage the high performance of fully-supervised object detectors and the low annotation cost of weakly-supervised object detectors.

The method may address this problem by exploiting the power of deep neural networks (DNNs), namely the region-based deep neural networks (Region-based DNNs).

Deep Neural Networks are a powerful set of techniques for learning in Neural Networks (as explained in [20]) which is a biologically-inspired programming paradigm enabling a computer to learn from observational data.

Figure 10:
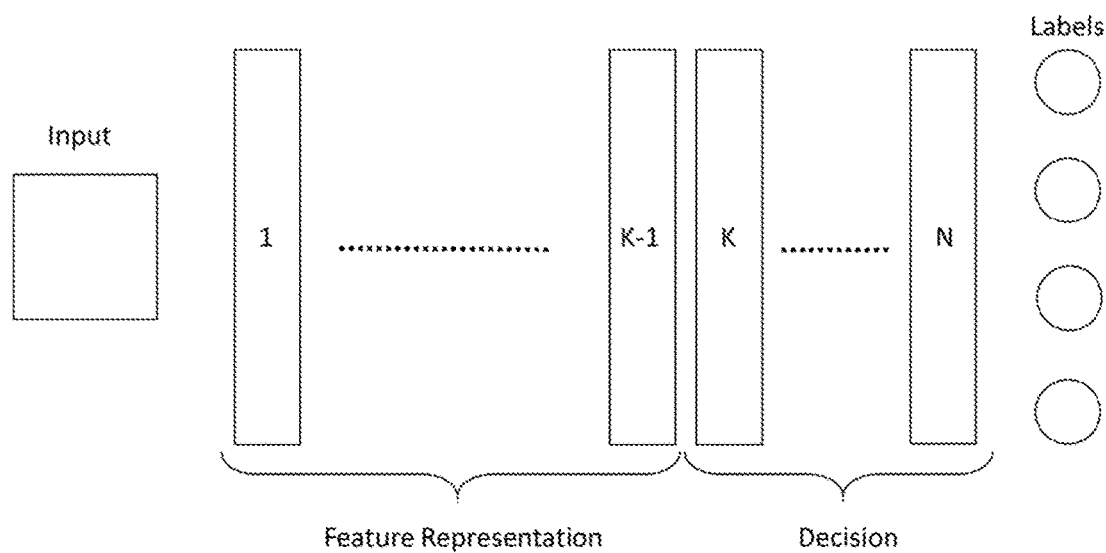

In object classification, the success of DNNs is attributed to their ability to learn rich midlevel 2D image representations as opposed to hand-designed low-level features (HOG, Bag-of-Words, SIFT, etc) used in other image categorization methods (SVM, Boosting, Random Forest, etc). More specifically, DNNs are focused on end-to-end learning based on raw data. In other words, they move away from feature engineering to a maximal extent possible, by accomplishing an end-to-end optimization starting with raw features and ending in labels, as shown on FIG. 10.

Unlike object classification, detection may require localizing (likely many) objects within an image in addition to classification (i.e. recognition). Region-based deep neural networks may solve the localization problem within the "recognition using regions" paradigm (as described in [18]).

Roughly, the network may learn to recognize region proposals during the offline stage. Region proposals may be provided by an external algorithm (e.g. [17]) or learned while training the network (e.g., [2]).

The method may perform the training of region-based deep neural networks either in fully-supervised or weakly-supervised fashion in any way, during the offline stage.

This method decomposes in two stages. The first stage which can be denoted as offline stage may rely heavily on the region-based deep neural networks and corresponds to the stage where the method may train two Models:

I. Model 1: corresponds to a weakly-supervised neural network detector. The method may for example use WSDDN, a state-of-the-art region-base weakly-supervised deep neural network (described in [8]).

II. Model 2: corresponds to a fully-supervised object detector. The method may for example use the Faster R-CNN, a state-of-the-art region-based fully-supervised neural network detector (described in [2]).

Table I below describes possible alternatives of implementation of the method:

TABLE I

Examples of neural networks implementable by the method

| | Tested implementation | Alternatives |
|---|---|---|
| Model 1 | Faster R-CNN | R-CNN, Fast R-CNN, PVANET |
| Model 2 | WSDDN | ContextLocNet |

R-CNN is described in [18].
Fast R-CNN is described in [17].
PVANET is described in [4].
ContextLocNet is described in [78].

As shown by table I, the method was tested in the configuration provided by the central column and the results obtained are now discussed.

In the results, one could observe a relative performance gain from model 1 to model 2 of 48%. Performance of object detectors were evaluated thanks to a metric called "mean average precision" ([21]). This metric corresponds to a percentage, the higher it is, the more accurate the detector is. The implementation of Model 1 scored 27% mAP and the implementation of Model 2 scored 40% mAP.

The invention claimed is:

1. A computer-implemented method comprising:
obtaining a first dataset of images, the first dataset of images including first images, each first image being associated with image-level labels;
performing a first learning on the first dataset, the first learning determining a first function, the first function being configured to take as input an image and to generate as output one or more respective localizations each of a respective instantiation of a respective object category and, for each localization, a confidence score representing a probability of instantiation of a respective object category at the respective localization, the first learning being a weakly-supervised learning;
obtaining a second dataset of second images;
for each respective one of at least a subset of the images:
fully-automatically applying the first function, the first function outputting respective couples each including a respective localization and a respective confidence score, and
fully-automatically determining, based on the output of the first function, one or more respective annotations, each annotation including a respective localization and a respective label representing instantiation a respective object category at the respective localization;
fully-automatically forming a third dataset configured for learning a second function, the dataset including pieces of data, each piece of data including a respective third image of the subset and at least a part of the one or more annotations determined for the third respective image by the first function, the second function being configured to take as an input an image and to output respective one or more respective localizations and, for each localization a respective confidence score, the confidence score representing a probability of instantiation of a respective object category at the respective localization, the third dataset being a dataset of third images each having pseudo strong annotations; and
performing a second learning on the third dataset to determine a second function, the second function applying to images and outputting respective couples each including a respective localization and one or more respective confidence scores, each confidence score representing a probability of instantiation of a respective object category at the respective localization, the second learning being a fully-supervised learning.

2. The method of claim 1, wherein the respective localization is a bounding box.

3. The method of claim 2, wherein the method further comprises grouping one or more proximate bounding boxes representing a same object category.

4. The method of claim 3, wherein the grouping of one or more proximate bounding boxes representing the same object category is performed by:
determining one or more clusters of the one or more proximate bounding boxes, and
determining a single bounding box from each of the determined clusters, thereby associating the determined single bounding box to the object category corresponding to the cluster.

5. The method of claim 4, wherein determining the single bounding box further includes the determination of coordinates of the single bounding box by averaging the coordinates of the bounding boxes of the determined cluster.

6. The method of claim 1, wherein the localization of each respective annotation corresponds to one or more localizations outputted by the first function, the object category respective to each respective annotation being an object category having a probability of instantiation, at the one or more localizations outputted by the first function that correspond to the localization of the respective annotation, which is represented by a respective confidence score which is strictly superior to zero.

7. The method of claim 6, wherein the object category respective to each respective annotation is the object category having a probability of instantiation, at the one or more localizations outputted by the first function that correspond to the localization of the respective annotation, which is represented by the highest confidence score.

8. The method of claim 6, wherein the object category respective to each respective annotation is an object category having a probability of instantiation, at the one or more localizations outputted by the first function that correspond to the localization of the respective annotation, which is represented by a respective confidence score which is superior to a strictly positive threshold, the threshold having a value which depends on a mean number of objects in the images.

9. The method of claim 6, wherein, for each respective image of at least a part of the subset:
the respective image is obtained with respective initial labels, each initial label representing instantiation of a respective object category in the respective image, and
the label of each respective annotation of the respective image representing instantiation of a respective object category corresponding to an initial label of the respective image.

10. The method of claim 1, wherein the first dataset including first pieces of data, each initial piece of data including a respective image and a respective one or more image-level labels, each image-level label representing instantiation of a respective object category in the respective image.

11. A device comprising:
a non-transitory storage having stored thereon a data structure, the data structure including a computer program including instructions for performing a computer-implemented method including:
obtaining a first dataset of images, the first dataset of images including first images, each first image being associated with image-level labels;
performing a first learning on the first dataset, the first learning determining a first function, the first function being configured to take as input an image and to provide as output one or more respective localizations each of a respective instantiation of a respective object category and, for each localization, a confidence score representing a probability of instantiation of a respective object category at the respective localization, the first learning being a weakly-supervised learning;
obtaining a second dataset of second images;
for each respective second image of at least a subset of the second dataset:
fully-automatically applying the first function, the first function outputting respective couples each including a respective localization and a respective confidence score;
fully-automatically determining, based on the output of the first function, one or more respective annotations, each annotation including a respective localization and a respective label representing instantiation a respective object category at the respective localization; and
fully-automatically forming a third dataset configured to learn a second function, the dataset including pieces of data, each piece of data including a respective third image of the subset and at least a part of the one or more annotations determined for the respective third image, the second function being configured to take as an input an image and to provide as an output respective one or more respective localizations and, for each localization a respective confidence score, the confidence score representing a probability of instantiation of a respective object category at the respective localization, the third dataset being a dataset of third images each having pseudo strong annotations; and
performing a second learning on the third dataset to determine a second function, the second function applying to images and outputting respective couples each including a respective localization and one or more respective confidence scores, each confidence score representing a probability of instantiation of a respective object category at the respective localization, the second learning being a fully-supervised learning.

12. The device of claim 11, wherein the storage is computer-readable, the device forming a computer-readable medium.

13. The device of claim 11, wherein the storage is a memory, the device further comprising a processor coupled to the memory, the device forming a computer system.

14. A device comprising:
a non-transitory storage having stored thereon a data structure, the data structure including a dataset formed by a computer-implemented method that when executed by processing circuitry causes the processing circuitry to be configured to:
obtain a first dataset of images, the first dataset of images including first images, each first image being associated with image-level labels;
perform a first learning on the first dataset, the first learning determining a first function, the first function being configured to take as input an image and to provide as output one or more respective localizations each of a respective instantiation of a respective object category and, for each localization, a confidence score representing a probability of instantiation of a respective object category at the respective localization, the first learning being a weakly-supervised learning;
obtain a second dataset of second images;
for each respective second image of at least a subset of the second dataset:
fully-automatically apply the first function, the first function outputting respective couples each including a respective localization and a respective confidence score;
fully-automatically determine, based on the output of the first function, one or more respective annotations, each annotation including a respective localization and a respective label representing instantiation a respective object category at the respective localization; and
fully-automatically form a third dataset configured to learn a second function, the dataset including pieces of data, each piece of data including a respective third image of the subset and at least a part of the one or more annotations determined for the respective third image, the second function being configured to take as an input an image and to provide as an output respective one or more respective localizations and, for each localization a respective confidence score, the confidence score representing a probability of instantiation of a respective object category at the respective localization, the third dataset being a dataset of third images each having pseudo strong annotations; and
perform a second learning on the third dataset to determine a second function, the second function applying to images and outputting respective couples each including a respective localization and one or more respective confidence scores, each confidence score representing a probability of instantiation of a respective object category at the respective localization, the second learning being a fully-supervised learning.

15. The device of claim 14, wherein the storage is computer-readable, the device forming a computer-readable medium.

16. The device of claim 14, wherein the storage is a memory, the device further comprising the processing circuitry coupled to the memory, the device forming a computer system.

17. A device comprising:
- a non-transitory storage having stored thereon a data structure, the data structure including a fully-supervised learnt function learnable according to a computer-implemented method of signal processing that when executed by processing circuitry causes the processing circuitry to be configured to:
- obtain a first dataset of images, the first dataset of images including first images, each first image being associated with image-level labels;
- perform a first learning on the first dataset, the first learning determining a first function, the first function being configured to take as input an image and to provide as output one or more respective localizations each of a respective instantiation of a respective object category and, for each localization, a confidence score representing a probability of instantiation of a respective object category at the respective localization, the first learning being a weakly-supervised learning;
- obtain a second dataset of second images;
- for each respective second image of at least a subset of the second dataset:
  - fully-automatically apply the first function, the first function outputting respective couples each including a respective localization and a respective confidence score;
  - fully-automatically determine, based on the output of the first function, one or more respective annotations, each annotation including a respective localization and a respective label representing instantiation a respective object category at the respective localization; and
- fully-automatically form a third dataset configured to learn a second function, the dataset including pieces of data, each piece of data including a respective third image of the subset and at least a part of the one or more annotations determined for the respective third image, the second function being configured to take as an input an image and to provide as an output respective one or more respective localizations and, for each localization a respective confidence score, the confidence score representing a probability of instantiation of a respective object category at the respective localization, the third dataset being a dataset of third images each having pseudo strong annotations; and
- perform a second learning on the third dataset to determine a second function, the second function applying to images and outputting respective couples each including a respective localization and one or more respective confidence scores, each confidence score representing a probability of instantiation of a respective object category at the respective localization, the second learning being a fully-supervised learning.

18. The device of claim 17, wherein the non-transitory storage is computer-readable, the device forming a non-transitory computer-readable medium.

19. The device of claim 17, wherein the storage is a memory, the device further comprising the processing circuitry coupled to the memory, the device forming a computer system.

* * * * *